US012296584B2

(12) United States Patent
Ishida et al.

(10) Patent No.: US 12,296,584 B2
(45) Date of Patent: May 13, 2025

(54) LIQUID EJECTION HEAD AND LIQUID EJECTION APPARATUS

(71) Applicant: CANON KABUSHIKI KAISHA, Tokyo (JP)

(72) Inventors: Koichi Ishida, Tokyo (JP); Shuzo Iwanaga, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 17/877,501

(22) Filed: Jul. 29, 2022

(65) Prior Publication Data

US 2023/0039160 A1 Feb. 9, 2023

(30) Foreign Application Priority Data

Aug. 2, 2021 (JP) ................................. 2021-126540

(51) Int. Cl.
*B41J 2/045* (2006.01)
*B41J 2/14* (2006.01)

(52) U.S. Cl.
CPC ....... *B41J 2/04563* (2013.01); *B41J 2/04528* (2013.01); *B41J 2/0458* (2013.01); *B41J 2/14153* (2013.01)

(58) Field of Classification Search
CPC .................. B41J 2/0458; B41J 2/04563; B41J 11/00216
See application file for complete search history.

(56) References Cited

U.S. PATENT DOCUMENTS 8,820,913 B2 * 9/2014 Koase ................ B41J 11/00216 347/102
10,603,909 B2 * 3/2020 Kawabe ............... C09D 11/326
2010/0165053 A1 * 7/2010 Bergstedt ............... B41J 2/0458 347/62

FOREIGN PATENT DOCUMENTS

| | | | |
|---|---|---|---|
| JP | 2005022160 | A | 1/2005 |
| JP | 2006205612 | A | 8/2006 |
| JP | 2011255631 | A | 12/2011 |
| JP | 2019014139 | A | 1/2019 |
| JP | 2019081306 | A | 5/2019 |
| JP | 2019162783 | A | 9/2019 |

* cited by examiner

*Primary Examiner* — Lam S Nguyen
(74) *Attorney, Agent, or Firm* — Canon U.S.A., Inc. IP Division

(57) ABSTRACT

A liquid ejection head includes a print element substrate having an ejection port surface in which a plurality of ejection ports are arranged and a temperature control unit that controls a temperature of the ejection port surface. The print element substrate ejects a liquid from the plurality of ejection ports onto a medium moved by the liquid ejection head relatively to the liquid ejection head. The ejection port surface includes a region on a downstream side of the ejection port surface in a direction in which the medium relatively moves when the medium is viewed from the liquid ejection head, and includes a region on an upstream side of the ejection port surface in the relative moving direction. The temperature control unit control the temperature of the ejection port surface so that a temperature of the downstream side region becomes higher than a temperature of the upstream side region.

18 Claims, 16 Drawing Sheets

LIQUID EJECTION HEAD AND LIQUID EJECTION APPARATUS

BACKGROUND

Field

The present disclosure relates to a liquid ejection apparatus for ejecting a liquid such as ink toward a medium onto which the liquid is ejected.

Description of the Related Art

In general, in a liquid ejection apparatus, a liquid ejection head ejects the liquid toward a medium onto which the liquid is ejected while relatively moving the liquid ejection head and the medium. At this time, moisture of the liquid ejected and landed on the medium evaporates, and dew condensation may occur on a surface where the ejection port of the liquid ejection head is formed (the ejection port surface of a print element substrate).

Japanese Patent Application Laid-Open No. 2005-22160 discloses an inkjet printer capable of preventing such dew condensation. The inkjet printer includes a head heating unit for heating the lower surface of the head to a temperature higher than the dew point temperature.

Further, Japanese Patent Application Laid-Open No. 2019-81306 discloses a liquid ejection apparatus capable of preventing such dew condensation. The liquid ejection apparatus is provided with a platen facing the liquid ejection head and supporting a print medium. A plurality of heating parts are provided in the platen continuously arranged along the conveying direction of the print medium. The nozzle surface can be heated while heating the print medium to an appropriate temperature by making the temperature of the heating part at a position where the print medium does not overlap higher than the temperature of the heating part at a position where the print medium overlaps. By heating the nozzle surface, dew condensation can be suppressed.

In the inkjet printer disclosed in Japanese Patent Application Laid-Open No. 2005-22160, the head heating means heats the entire lower surface of the head uniformly. In the liquid ejection apparatus disclosed in Japanese Patent Application Laid-Open No. 2019-81306, the entire nozzle surface is heated uniformly. Therefore, these technologies require a large amount of energy to prevent condensation.

SUMMARY

The present disclosure relates to a liquid ejection head that works towards suppressing unnecessary energy consumption and efficiently suppressing dew condensation occurring on an ejection port surface of the print element substrate.

According to an aspect of the present disclosure, a liquid ejection head includes a print element substrate including an ejection port surface in which a plurality of ejection ports are arranged, and a temperature control unit configured to control a temperature of the ejection port surface, wherein the print element substrate is configured to eject a liquid from the plurality of ejection ports onto a medium and the liquid ejection head is configured to move the medium relatively to the liquid ejection head, wherein the ejection port surface includes a region on a downstream side of the ejection port surface in a direction in which the medium relatively moves when the medium is viewed from the liquid ejection head, and includes a region on an upstream side of the ejection port surface in the relative moving direction, and wherein the temperature control unit is configured to control the temperature of the ejection port surface so that a temperature of the downstream side region becomes higher than a temperature of the upstream side region.

Further features of the present disclosure will become apparent from the following description of exemplary embodiments with reference to the attached drawings.

DESCRIPTION OF THE EMBODIMENTS

Figure 1:
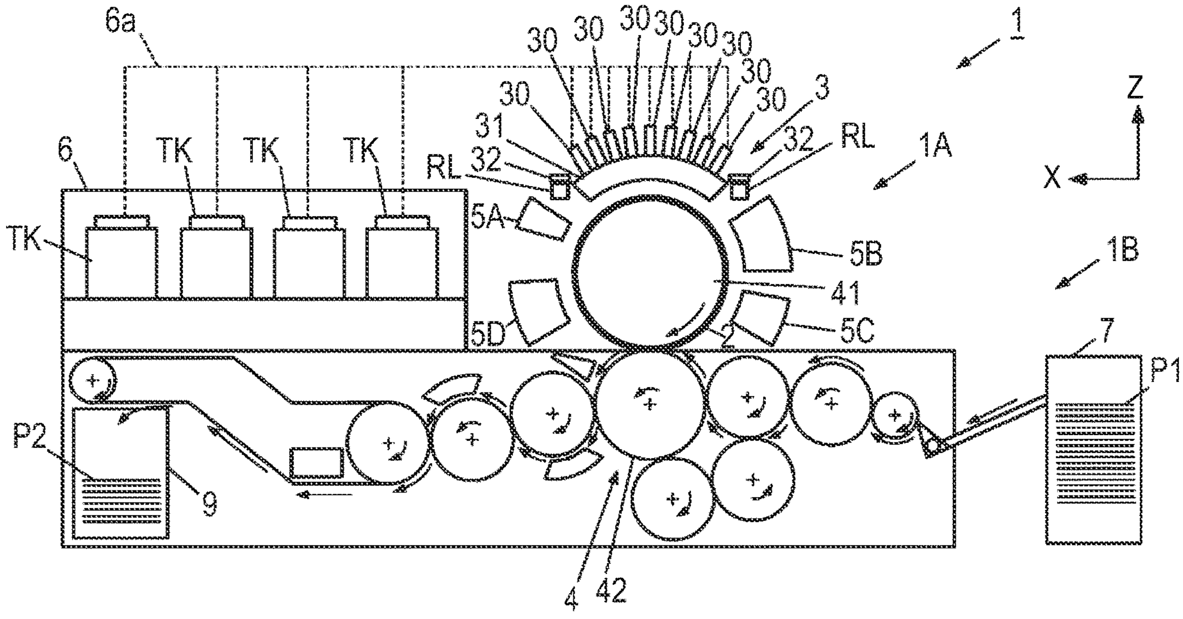
FIG. 1 is a front view schematically showing a print apparatus according to a first embodiment of the present disclosure.

Embodiments of the present disclosure will now be described in detail with reference to the drawings. However, the constituent elements described in the embodiments are merely examples, and the scope of the present disclosure is not intended to be limited thereto. In the present specification and the drawings, components having the same functions are denoted by the same reference numerals, so that duplicate description may be omitted.

In the following embodiments, a liquid ejection head and a liquid ejection apparatus for ejecting a liquid to perform printing will be described.

In the present specification, relative moving of the liquid ejection head and the medium onto which the liquid is ejected includes a moving of the medium while the liquid ejection head is stationary (Form 1) and a moving of the liquid ejection head while the medium is stationary (Form 2). In the Form 1, the relative moving direction of the medium when the medium is viewed from the liquid ejection head corresponds to the moving direction of the medium. In this case, an upstream side and a downstream side are defined based on the actual moving direction of the medium. On the other hand, in the Form 2, the relative moving direction of the medium when the medium is viewed from the liquid ejection head corresponds to the direction opposite to the moving direction of the liquid ejection head. When the medium is viewed from the liquid ejection head, it appears that the stationary medium to be ejected is moving in a direction opposite to the moving direction of the liquid ejection head (refer to the operation description of FIGS. 10A and 10B to be described later). Therefore, in the Form 2, the upstream side and the downstream side are defined based on the apparent moving direction of the medium. Note that the medium onto which the liquid is ejected may be any medium as long as it is capable of imparting a liquid, such as a transfer body and a print medium.

First Embodiment (Explanation of Entire Print Apparatus)

FIG. 1 is a front view schematically showing a print apparatus 1 according to a first embodiment of the present disclosure. The print apparatus 1 is a sheet-fed inkjet printer (a liquid ejection apparatus) for manufacturing a printed material P2 by transferring an image of a liquid such as ink to a print medium P1 via a transfer body 2. The print apparatus 1 includes a print mechanism 1A and a conveying mechanism 1B. In this embodiment, the X direction, the Y direction, and the Z direction indicate the width direction (the overall length direction), the depth direction, and the height direction of the print apparatus 1, respectively. Here, arrows X and Y indicate a horizontal direction and an orthogonal to each other. The arrow Z indicates the vertical direction.

The print medium P1 is conveyed in the X direction. The print mechanism 1A includes a print unit 3, a transfer unit 4, peripheral units 5A-5D, and a supply unit 6. The print unit 3 includes a plurality of print heads 30 and a carriage 31. The print head 30 is a liquid ejection head.

(Explanation of Print Unit)

Figure 2:
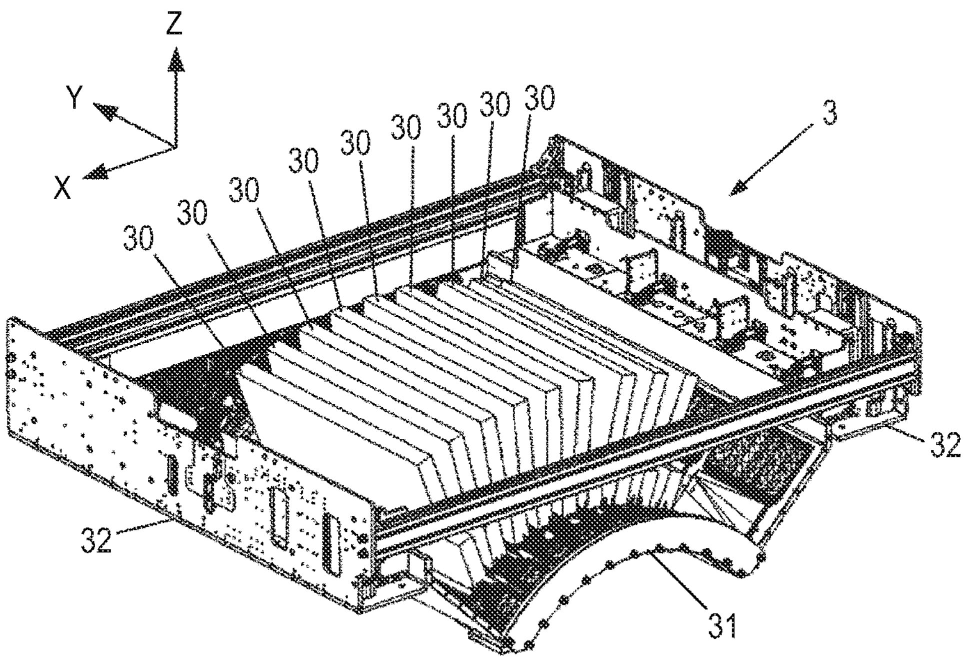
FIG. 2 is a perspective view of a print unit.

FIG. 2 is a perspective view of the print unit 3. The print head 30 ejects a liquid such as ink toward the transfer body 2, which is a medium onto which the liquid is ejected, and forms a liquid image to be a print image on the medium, that is, on the transfer body 2. In this embodiment, the print head 30 is a full line head extending in the Y direction, and a plurality of print element substrates are arranged over the entire printable region in the width direction of the print medium having the largest usable size. The print head 30 is fixed to the carriage 31, and has an ejection port surface having an ejection port opened on its lower surface. The ejection port surface faces a surface of the transfer body 2 through a minute gap. The minute gap is, for example, several millimeters (specifically, 2 mm). The transfer body 2 is attached to the outer peripheral surface of a rotating cylindrical transfer cylinder 41, and circularly moves on a circular track coinciding with the outer peripheral surface of the transfer cylinder 41 in accordance with the rotation of the transfer cylinder 41. The plurality of print heads 30 are arranged radially along the circular track of the transfer body 2, that is, the outer peripheral surface of the transfer cylinder 41.

In this embodiment, nine print heads 30 each of which is for ejecting different kinds of ink are provided. The different kinds of inks are, for example, inks having different color materials, such as yellow ink, magenta ink, cyan ink, and black ink. In the present embodiment, one print head 30 is configured to eject one kind of ink, but the present disclosure is not limited thereto. One print head 30 may be configured to eject a plurality of types of ink. Further, a part of the plurality of print heads 30 may eject ink containing no color material (for example, clear ink).

(Explanation of Recovery Position and Ejection Position of Print Head)

Figure 3:
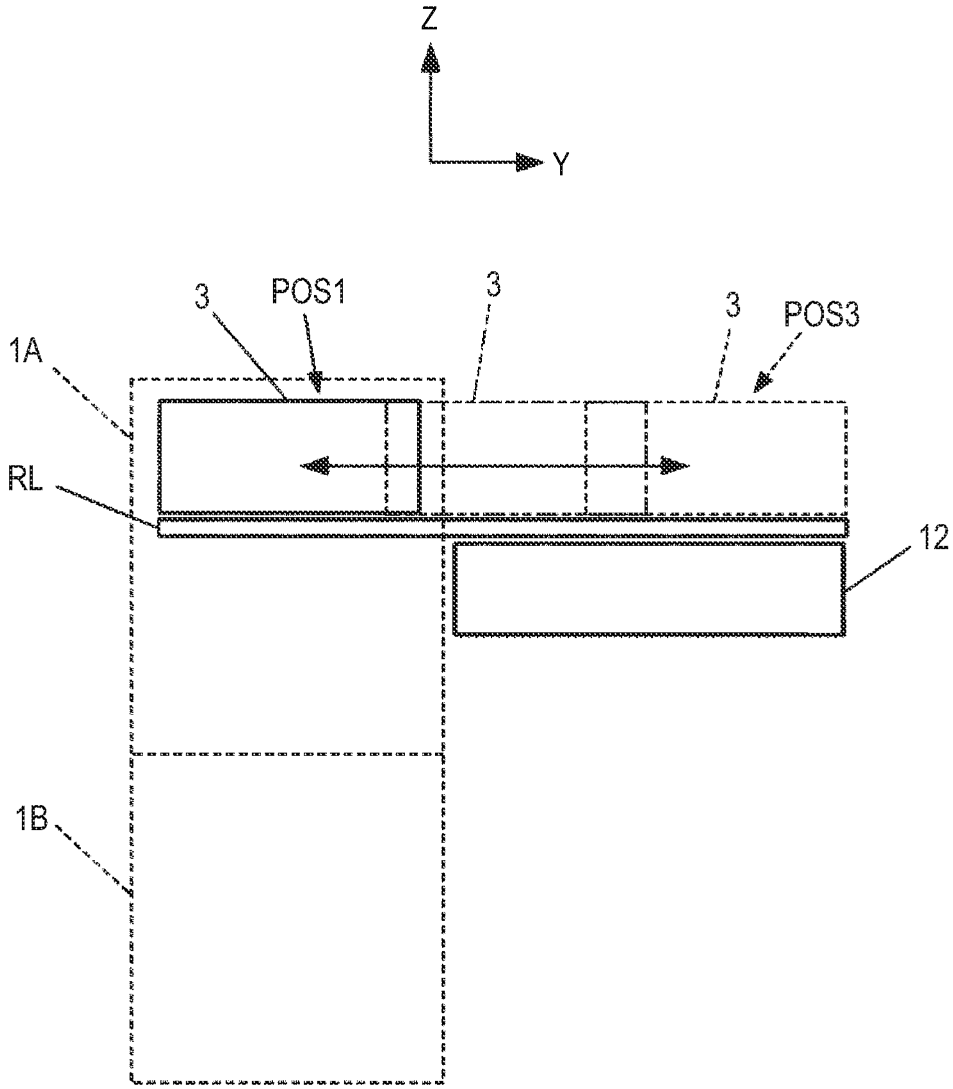
FIG. 3 is a schematic diagram showing the movement of the print unit.

Each of the print heads 30 is mounted on the carriage 31. A slide part 32 for moving the carriage 31 in the Y direction is provided on both sides of the carriage 31 in the X direction. FIG. 3 is a schematic diagram showing the movement of the print unit 3. FIG. 3 shows a state in which the print apparatus 1 is viewed from the right side. The print unit 3 is guided along the guide member RL and is movable between an ejection position POS1 and a recovery position POS3. The print unit 3 performs an ejection operation at the ejection position POS1. At the recovery position POS3, the recovery unit 12 performs a process for recovering the ejection performance of the print head 30.

(Peripheral Units)

The peripheral units 5A-5D are arranged along the outer peripheral surface of the transfer cylinder 41, and includes an imparting unit 5A, an absorbing unit 5B, a heating unit 5C, and a cleaning unit 5D.

The imparting unit 5A is a mechanism for imparting a reaction liquid onto the transfer body 2 before ink is ejected by the print unit 3. The reaction liquid is a liquid containing a component for increasing the viscosity of the ink. Here, the viscosity increase of the ink means that a coloring material, a resin or the like constituting the ink is chemically reacted or physically adsorbed by contacting with a component for increasing the viscosity of the ink, thereby increasing the viscosity of the ink. This increase in the viscosity of the ink includes not only the case where the viscosity of the ink as a whole increases, but also the case where the viscosity increases locally due to the aggregation of a part of the components constituting the ink such as a coloring material and a resin.

The absorbing unit 5B is a mechanism for absorbing a liquid component from an ink image (image) on the transfer body 2 before transfer. The absorbing unit 5B includes, for example, a liquid absorbing member for reducing the amount of a liquid component of the ink image by contacting with the ink image. The liquid absorbing member may be a member formed on the outer peripheral surface of the roller. The liquid absorbing member may be an endless belt-like sheet composed of a porous body. From the viewpoint of protecting the ink image, the liquid absorbing member may be moved synchronously with the transfer body 2 by making the moving speed of the liquid absorbing member equal to the peripheral speed of the transfer body 2.

The heating unit 5C is a mechanism for heating an ink image on the transfer body 2 before transfer. By heating the ink image, the resin in the ink image is melted, and the transferability to the print medium P is improved. The heating temperature may be equal to or higher than the minimum film forming temperature (MFT) of the resin. The MFT can be measured by commonly known methods, for example, using instruments conforming to JIS K 6828-2: 2003, or ISO 2115: 1996. From the viewpoint of transferability and image robustness, heating may be performed at a temperature 10° C. or higher than that of the MFT, and further heating may be performed at a temperature 20° C. or higher than that of the MFT. In this embodiment, the temperature is heated to about 110° C. to 120° C. As the heating unit 5C, a known heating device such as various lamps such as infrared rays, a hot air fan or the like can be used. An infrared heater may be used from the viewpoint of heating efficiency.

The cleaning unit 5D is a mechanism for cleaning the transfer body 2 after transfer. The cleaning unit 5D removes ink remaining on the transfer body 2, dust on the transfer body 2, and the like. For the cleaning unit 5D, for example, a known method such as a method in which the porous member is brought into contact with the transfer body 2, a method in which the surface of the transfer body 2 is rubbed with a brush, a method in which the surface of the transfer body 2 is scraped with a blade, and the like can be used appropriately.

The cleaning member used for cleaning may have a known shape such as a roller shape or a web shape.

(Supply Unit)

The supply unit 6 is a mechanism for supplying the ink to each of the print heads 30 of the print unit 3. The supply unit 6 includes a storage part TK for storing the ink and a flow path 6*a* for each type of ink, and the ink is supplied from the storage part TK to the print head 30 via the flow path 6*a*. The storage part TK may be constituted of a main tank and a sub tank. The flow path 6*a* may be a flow path for circulating the ink between the storage part TK and the print head 30. The supply unit 6 may be provided with a pump for sending the ink. Further, a degassing mechanism for degassing bubbles in the ink and a valve for adjusting the liquid pressure of the ink and the atmospheric pressure may be provided in the middle of the flow path 6*a* or in the storage part TK. The height of the storage part TK and the print head 30 in the Z direction may be set so that the liquid level of the ink in the storage part TK is lower than the ink ejection surface of the print head 30.

(Conveying Mechanism)

The conveying mechanism 1B feeds the print medium P1 to the transfer unit 4 and discharges the printed material P2 to which the ink image is transferred from the transfer unit 4. In FIG. 1, the direction of rotation of each member of the conveying mechanism 1B and the conveying path of the print medium P1 and the printed material P2 are indicated by arrows. In the conveying mechanism 1B, the print medium P1 is conveyed from a feeding unit 7 to the transfer unit 4, and the printed material P2 is conveyed from the transfer unit 4 to a collection unit 9.

(Explanation of Print Operation)

Figure 4:
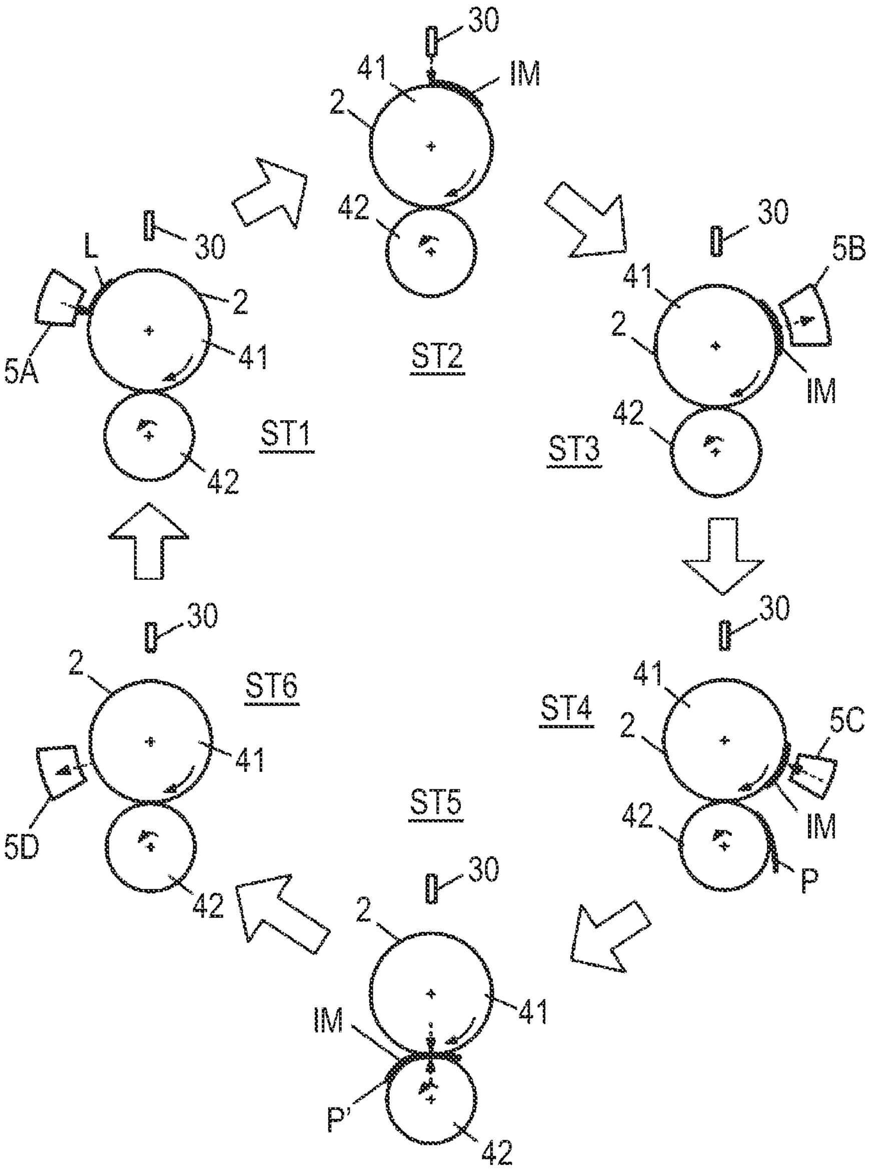
FIG. 4 is a diagram schematically showing a process example of a print operation.

FIG. 4 is a diagram schematically showing a process example of the print operation. While the transfer cylinder 41 and an impression cylinder 42 are rotating, the following steps are cyclically performed.

First, the reaction liquid L is applied from the imparting unit 5A to the transfer body 2 (ST1). When a position on the transfer body 2 to which the reaction liquid L is applied reaches a position facing the print head 30 with the rotation of the transfer cylinder 41, the ink is ejected from the print head 30 to the transfer body 2, and an ink image IM is formed (ST2). At this time, the ejected ink is mixed with the reaction liquid L on the transfer body 2 to promote aggregation of the coloring material.

When the ink image IM on the transfer body 2 reaches a position facing the absorbing unit 5B with the rotation of the transfer body 2, the absorbing unit 5B comes into contact with the transfer body 2 to absorb a liquid component from the ink image IM (ST3). When the ink image IM reaches a position facing the heating unit 5C with the rotation of the transfer body 2, the heating unit 5C heats the ink image IM to about 110° C. to 120° C., and the resin in the ink image IM is melted to form a film (ST4).

The print medium P1 is conveyed by the conveying mechanism 1B in synchronization with the formation of the ink image IM. When the ink image IM and the print medium P1 reach the nip portion between the transfer body 2 and the impression cylinder 42, the ink image IM is transferred to the print medium P1, and the printed material P2 is manufactured (ST5).

After the transfer, with the rotation of the transfer body 2, when the portion where the ink image IM has been formed on the transfer body 2 reaches a position facing the cleaning unit 5D, the cleaning unit 5D cleans the ink image IM (ST6). By repeating these steps ST1 to ST6, a plurality of printed materials P2 are manufactured.

In the above description of the print operation, the transfer of the ink image IM to one print medium P1 is performed once by one rotation of the transfer body 2, but the transfer of the ink image IM to a plurality of print mediums P1 can be performed continuously by one rotation of the transfer body 2.

(Explanation of Liquid Ejection Head)

Next, the configuration of the liquid ejection head 30A used in the print head 30 will be described in detail.

Figure 12A:
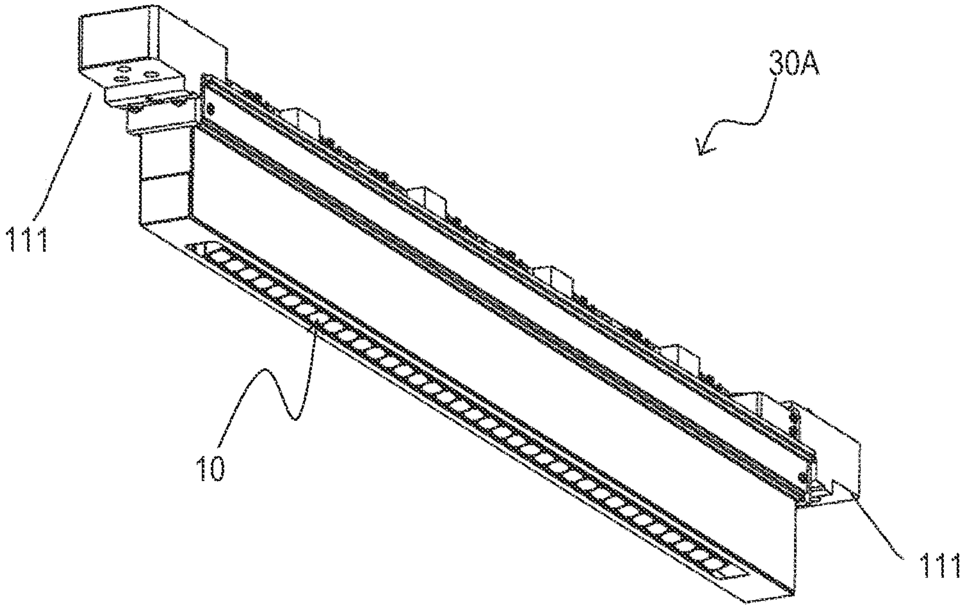
FIGS. 12A and 12B are perspective views of a liquid ejection head according to a first embodiment of the present disclosure.
Figure 12B:
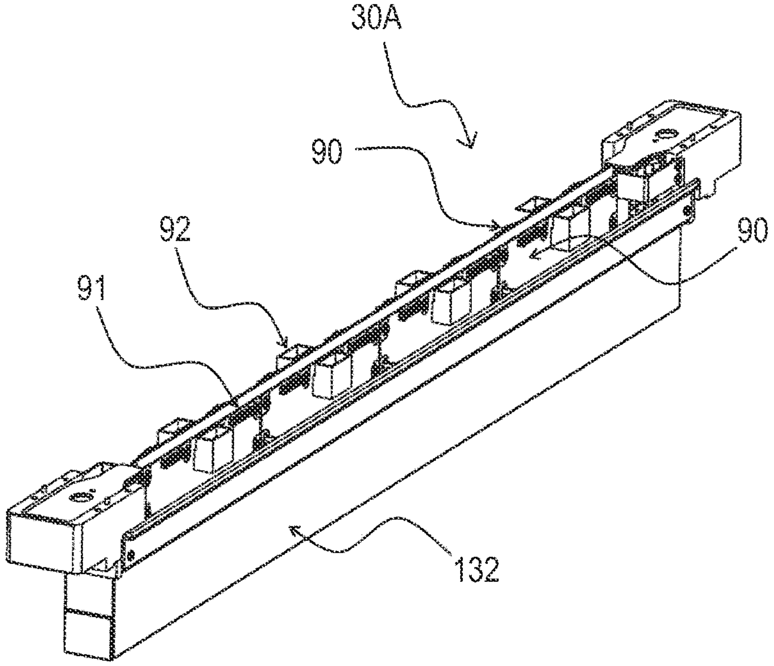

FIGS. 12A and 12B are perspective views of the liquid ejection head 30A according to the present embodiment. FIG. 12A is a view of the liquid ejection head 30A viewed obliquely from below on the liquid ejection side. FIG. 12B is a view of the liquid ejection head 30A viewed obliquely from above on the side opposite to the liquid ejection side.

The liquid ejection head 30A shown in FIGS. 12A and 12B is an ink jet and line type print head capable of printing with a liquid of one color. The liquid ejection head 30A includes a plurality of print element substrates 10, a liquid connection part 111, an electric wire substrate 90, a shield plate 132, a signal input terminal 91, and a power supply terminal 92. The plurality of print element substrates 10 are arranged on a straight line in the longitudinal direction of the liquid ejection head 30A. The signal input terminal 91 and the power supply terminal 92 are arranged along the longitudinal direction of the liquid ejection head 30A. As a result, it is possible to reduce voltage drop and signal transmission delay occurring in the wire part provided on the print element substrate 10.

Next, the print element substrate 10 will be described with reference to FIGS. 13 and 14.

Figure 13:
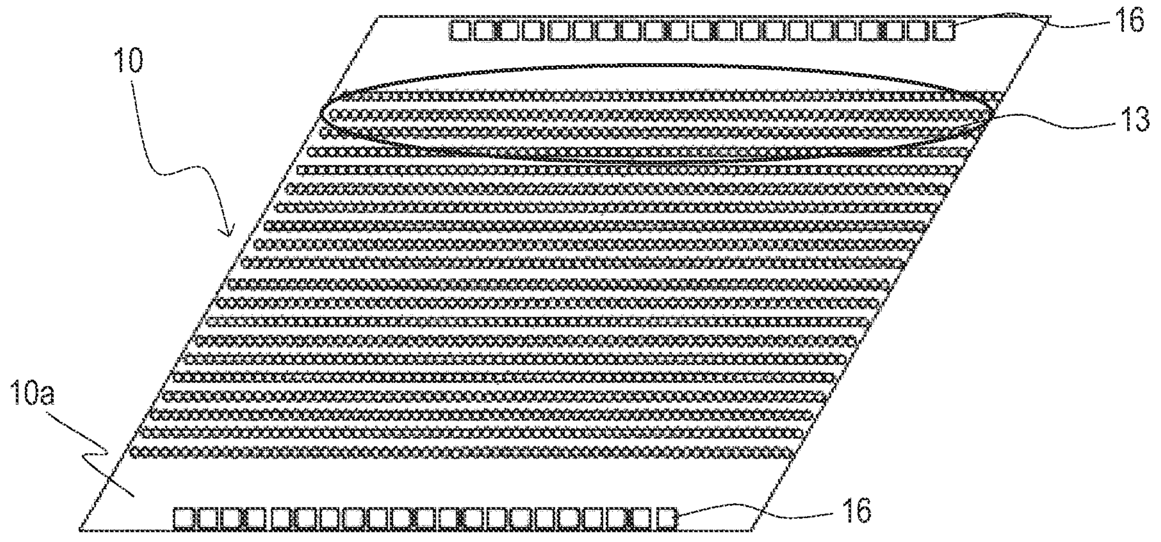
FIG. 13 is a schematic view of an ejection port surface of a print element substrate.

FIG. 13 is a schematic view of an ejection port surface 10*a* provided with an ejection port 13 of the print element substrate 10. The print element substrate 10 has a substantially parallelogram shape and has the ejection port surface 10*a* in which a plurality of ejection ports 13 are arranged in a row. A plurality of ejection port arrays are arranged in parallel on the ejection port surface 10*a*. Terminals 16 for electrical connection with a control unit of the print apparatus 1 are disposed at both ends of the ejection port surface 10*a*. Although not shown, a liquid supply path is provided for each ejection port row. A plurality of pressure chambers communicate with the liquid supply path, and the ejection port 13 is provided for each of pressure chambers. An energy generating element (not shown) for generating energy for ejecting a liquid from the ejection port 13 is arranged in the pressure chamber. The energy generating element is provided at each ejection port. As the energy generating element, for example, a heating element for foaming liquid by thermal energy and a piezoelectric element including a piezoelectric body can be used. The energy generating element is electrically connected to the terminal 16 by the electric wire. Liquid is supplied to the ejection ports 13 via the liquid supply path, and the liquid is ejected from the ejection ports 13 according to a control signal from the control unit of the print apparatus 1.

Figure 14:
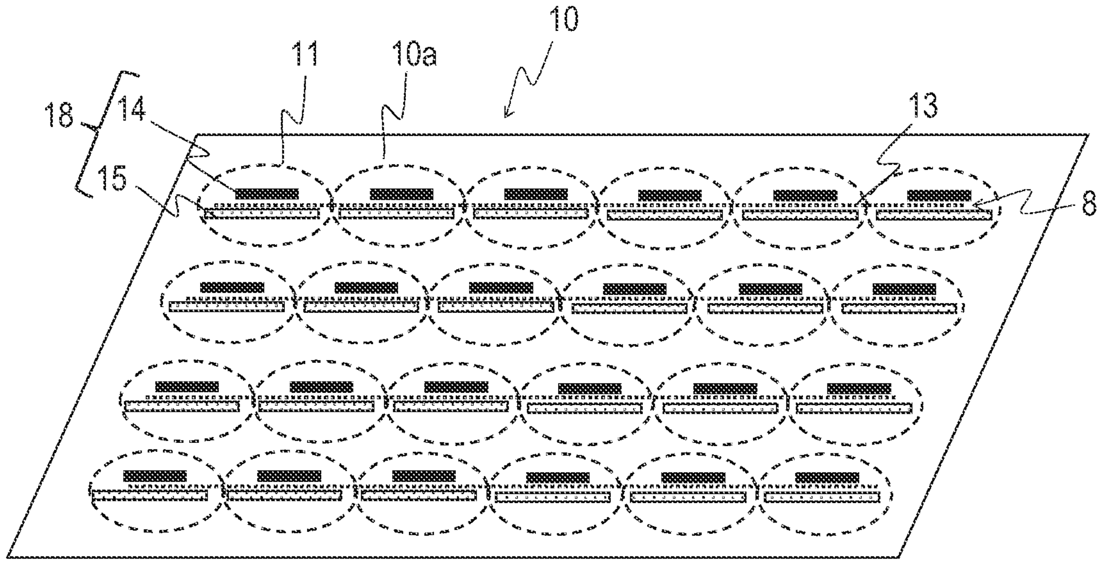
FIG. 14 is an enlarged view of a portion within the round frame shown in FIG. 13.

FIG. 14 is an enlarged view of the ejection port 13 within the round frame and the peripheral portion thereof shown in FIG. 13. FIG. 14 schematically shows a positional relationship between a controlled area 11 for temperature control, a temperature control heater 15, and a temperature sensor 14. The ejection port surface 10*a* is divided into a plurality of controlled areas 11. Here, a plurality of controlled areas 11 are provided to divide the ejection port row 8 into a plurality of areas. In each controlled area 11, the temperature control heater 15 and the temperature sensor 14 are provided at a distance which does not affect the operation of each other. The temperature sensor 14 detects the temperature of the surface of the controlled area 11 and is provided directly below the ejection port surface 10*a* on which the ejection port 13 is formed. The temperature control heater 15 can heat the controlled area 11. In each of the controlled areas 11, when the detected value of the temperature sensor 14 becomes equal to or less than a preset threshold value, the temperature control heater 15 is activated to heat the controlled area 11. When the detected value of the temperature sensor 14 exceeds the threshold value, heating by the temperature control heater 15 is stopped. Thus, the controlled area 11 can be maintained at a temperature corresponding to the threshold value.

A threshold value can be individually set for each of the controlled areas 11, and each of the controlled areas 11 can be individually set at an arbitrary temperature. That is, the controlled temperature of the ejection port surface 10*a* can be set or changed for each of the controlled areas. Further, by setting the controlled temperature for each of the controlled areas every moment, the controlled temperature can be changed in accordance with, for example, a change in the environmental temperature or a change in a job (such as a print job) related to a print operation.

The temperature sensor 14 of each of the controlled areas 11 and the corresponding temperature control heater 15 constitute a temperature control unit 18. The temperature control unit 18 can individually control the temperatures of the plurality of controlled areas 11, and can set a desired region of the ejection port surface 10*a* to an arbitrary temperature. For example, when the ejection port 13 ejects liquid to the moving transfer body 2, the temperature control unit 18 controls the temperature of the ejection port surface 10*a* so that the temperature of the region on the downstream side of the ejection port surface 10*a* is higher than the temperature of the region on the upstream side of the ejection port surface 10*a* in the moving direction of the print medium P.

As the temperature sensor 14, for example, a diode sensor can be used. In the example of FIG. 14, the shape of the temperature sensor 14 is long in the column direction of the ejection ports, but is not limited thereto. The shape of the temperature sensor 14 may be circular, square, or the like. In the example of FIG. 14, the ejection port surface 10*a* is heated by using the temperature control heater 15, but instead, the ejection port surface 10*a* may be heated by using a heating element (energy generating element) for ejecting liquid. In this case, the temperature control unit 18 activates the heating element with a power such that bubbles are not generated during a period in which the heating element does not perform an operation to generate thermal energy for ejecting liquid. A desired region of the ejection port surface 10*a* can be heated by using a heating element.

In the example of FIG. 14, the temperature control heater 15 is provided on the print element substrate 10, but is not limited thereto. If the ejection port surface 10*a* can be heated, the temperature control heater 15 may be provided on a member other than the print element substrate 10, for example, a member facing the liquid ejection head 30A. For example, the temperature control heater 15 may be provided on a transfer body which temporarily holds an intermediate image for transfer by liquid ejected from the liquid ejection head 30A.

(Explanation of Dew Condensation by Water Evaporation and Temperature Control)

Next, the dew condensation generated on the print element substrate 10 by the evaporation of the liquid imparted to the transfer body 2 and the temperature control of the print element substrate 10 will be described in detail. Here, for convenience, dew condensation by water evaporation when the liquid ejection head ejects liquid to the print medium P moving at the conveying speed U0, and the temperature control will be described.

As a result of verification by the inventors, it has been found that dew condensation on the ejection port surface tends to be more pronounced in the downstream side region with respect to the moving direction of the print medium when the print medium is viewed from the liquid ejection head. In other words, dew condensation hardly occurs in the region on the upstream side of the ejection port surface.

Figure 5A:
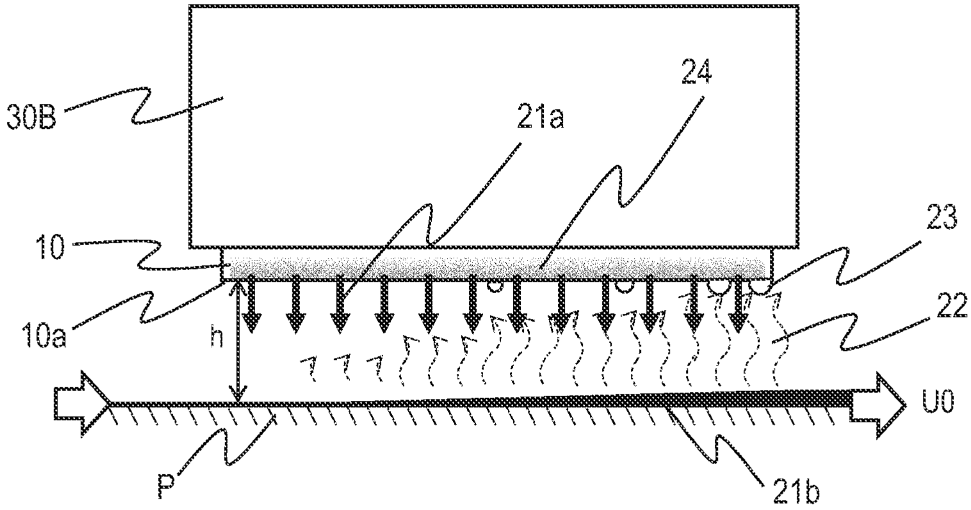
FIGS. 5A, 5B and 5C are schematic views for explaining dew condensation and temperature control of a print element substrate.
Figure 5B:
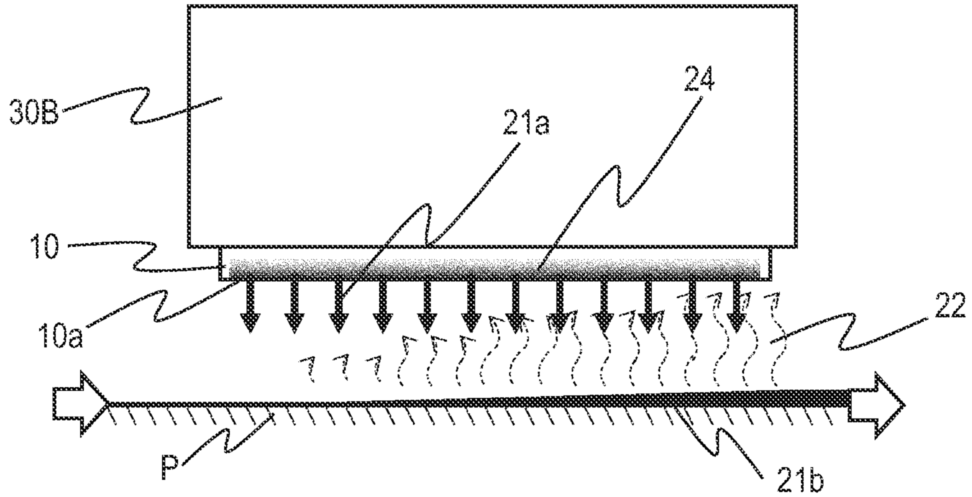
Figure 5C:
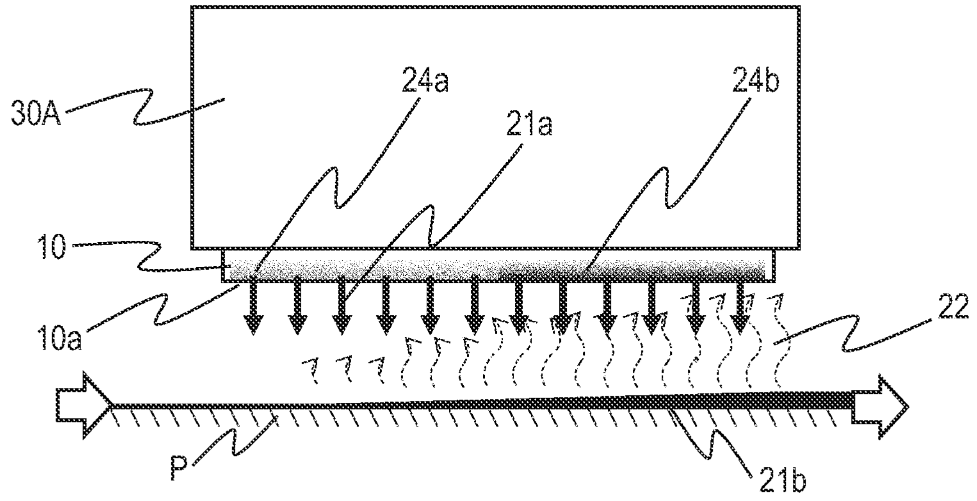

FIGS. 5A to 5C are schematic views for explaining dew condensation and temperature control of the print element substrate 10. FIGS. 5A and 5B show temperature control of the liquid ejection head 30B of the comparative example, and FIG. 5C shows temperature control of the liquid ejection head 30A of the present embodiment. The liquid ejection head 30B has the same structure as the liquid ejection head 30A described above except that the temperature control is different. Both the liquid ejection head 30A and the liquid ejection head 30B include the print element substrate 10 shown in FIG. 14.

Figure 6A:
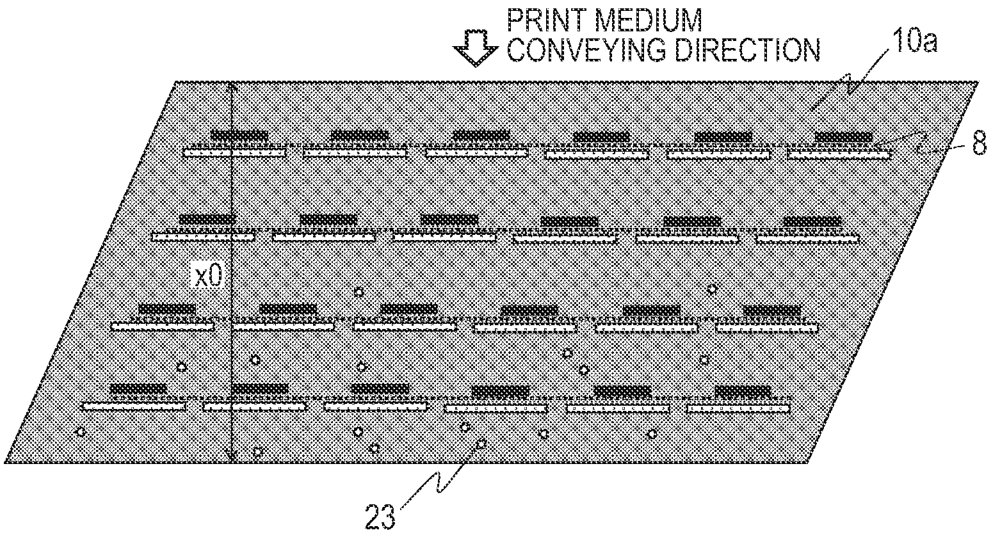
FIGS. 6A, 6B and 6C are schematic views for explaining the surface temperature of the print element substrate at the time of temperature control.
Figure 6B:
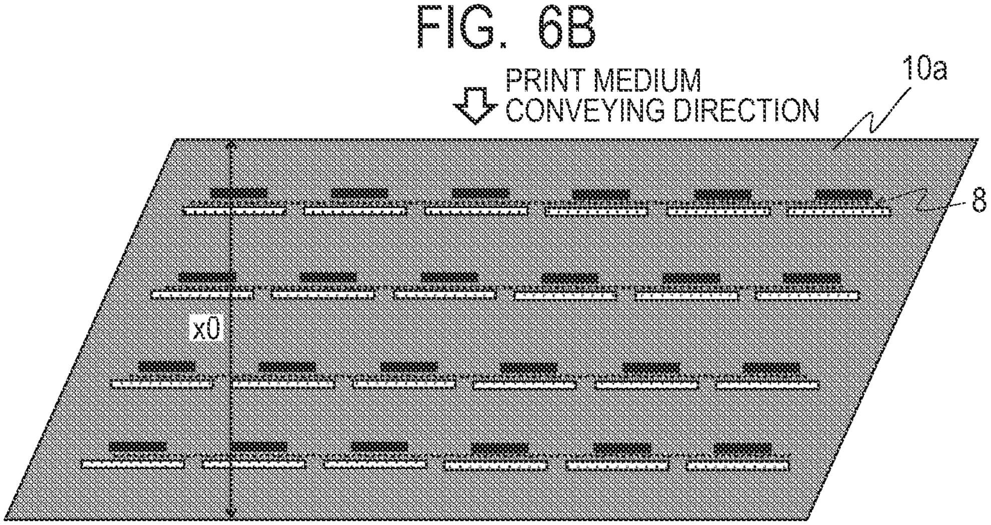
Figure 6C:
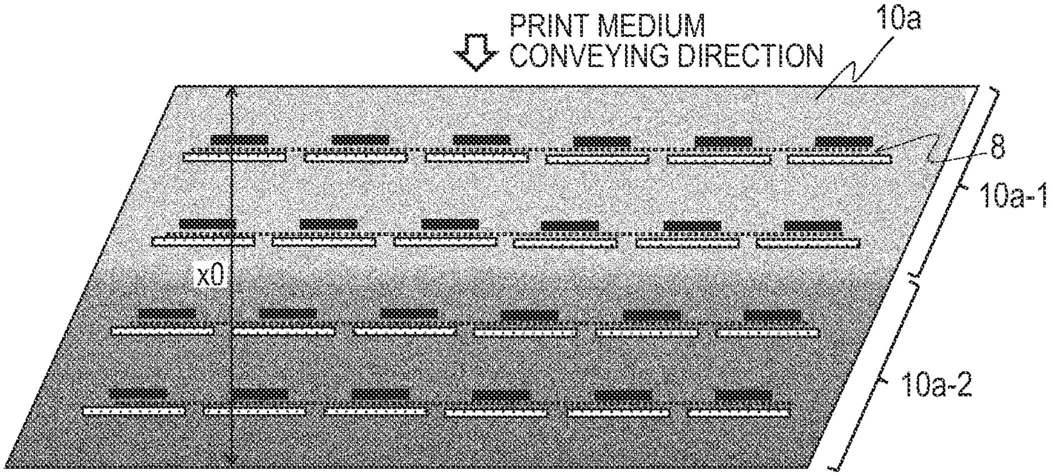

FIGS. 6A to 6C are schematic views for explaining the temperature of the surface (ejection port surface 10*a*) of the print element substrate 10 at the time of controlling the temperature. FIG. 6A corresponds to the temperature control of the comparative example of FIG. 5A, FIG. 6B corresponds to the temperature control of the comparative example of FIG. 5B, and FIG. 6C corresponds to the temperature control of the present embodiment of FIG. 5C. In FIGS. 6A to 6C, the surface temperature of the print element substrate 10 is represented by a gray level, where the light gray designates about 65° C. and the dark gray designates about 75° C.

First, the influence of moisture evaporation 22 on the print element substrate 10 will be described with reference to a comparative example shown in FIG. 5A.

In the comparative example of FIG. 5A, the print medium P is conveyed so as to pass through a position opposed to the liquid ejection head 30B. The liquid ejection head 30B ejects the liquid 21*a* toward the moving print medium P. Each ejection port row 8 of the print element substrate 10 is disposed so as to intersect the conveying direction of the print medium P. That is, with respect to the conveying direction of the print medium P, the ejection port row 8 are arranged in parallel from the upstream side to the downstream side. The liquid 21*a* is ejected sequentially from the ejection port row 8 on the upstream side in synchronization with the conveying operation of the print medium P. In this case, as the print medium P is conveyed to the downstream side, the amount of the liquid 21*b* (adhesion amount) ejected onto the print medium P increases, so that the amount of the moisture evaporation 22 increases as the moving to the downstream side. As a result, in the print element substrate 10, dew condensation tends to occur in the downstream side region. In other words, dew condensation hardly occurs in the region on the upstream side of the print element substrate 10. When the print medium P is heated, moisture evaporation 22 occurs frequently, but moisture evaporation 22 occurs even when the print medium P is not heated.

When dew condensation occurs on the print element substrate 10, during ejection, ejection droplets raised from the ejection ports 13 may touch the dew condensation droplets 23, or the dew condensation droplets 23 may enter the inside of the ejection ports 13, resulting in ejection failure. In this case, the quality of the printed image deteriorates.

Further, the longer the print element substrate 10 is in the moving direction of the print medium P, the greater the influence of the moisture evaporation 22 is, and as a result, the region (dew condensation region) where the dew condensation droplets 23 are generated is also increased. The generation of the dew condensation region depends on the relationship between the thickness of the laminar flow boundary layer formed on the print medium P by water evaporation 22 from the liquid ejected onto the print medium P and the distance between the print medium P and the print element substrate 10.

Figure 7:
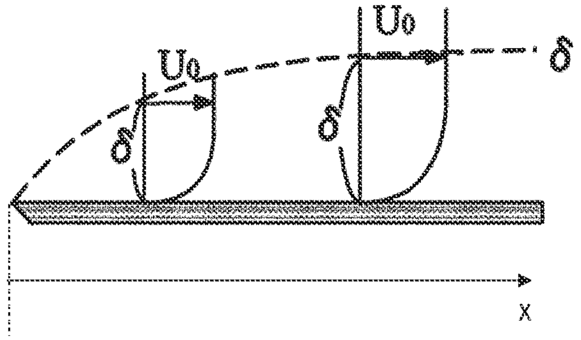
FIG. 7 is a schematic view illustrating the thickness of a laminar flow boundary layer.

The thickness of the laminar flow boundary layer will now be described. FIG. 7 is a schematic view for explaining the thickness of a laminar flow boundary layer developed on a flat plate. The thickness δ of the laminar flow boundary layer is given by the following equation.

$$\delta = \sqrt{\frac{30\mu x}{\rho U_0}} \approx 5.48\sqrt{\frac{\nu x}{U_0}}$$

where U0 is the velocity of the fluid, ν is the kinematic viscosity of the fluid, x is the distance from the tip, ρ is the density of the fluid, and μ is the viscosity coefficient of the fluid.

A laminar flow boundary layer shown in FIG. 7 is also formed on the print medium P by water evaporation 22. As a result of the verification by the inventors, it has been found that when the thickness δ of the laminar flow boundary layer becomes larger than the distance between the print medium P and the print element substrate 10, the influence of moisture evaporation 22 on the print element substrate 10 becomes large. Here, in both the liquid ejection head 30B and the liquid ejection head 30A shown in FIGS. 5A to 5C, the thickness δ of the laminar flow boundary layer is larger than the distance between the print medium P and the print element substrate 10 in the region on the downstream side of the print element substrate 10. Therefore, dew condensation tends to occur in the region on the downstream side of the print element substrate 10. That is, the region on the downstream side of the print element substrate 10 is a region (dew condensation region) having a large influence of moisture evaporation 22 (or influence of dew condensation).

Further, as a result of the verification by the inventors, it has been found that when a length of the print element substrate 10 in the moving direction (conveying direction) of the print medium P is x0, the influence of moisture evaporation 22 becomes large when the substrate length x0 satisfies the following equation.

$$x0 > 0.0333 \times h^2 \times U0/\nu$$

Here, h is assumed as the height from the print medium P to the print element substrate 10, U0 is assumed as the moving speed of the print medium P, and ν is the kinematic viscosity of air. For example, when h is about 2 mm, U0 is about 0.6 meters per second (m/s), and ν is $1.9\times10^{-5}$ $m^2/s$, the influence of moisture evaporation 22 becomes large when the length x0 of the print element substrate 10 is about 4.1 mm or more. Here, the length x0 of the print element substrate 10 is about 15 mm, which is easily affected by moisture evaporation 22.

If the distance between the print medium P and the print element substrate 10 over the entire print element substrate 10 is made larger than the thickness of the laminar flow boundary layer on the print medium, it is difficult to cause dew condensation on the print element substrate 10. However, if the distance between the print medium P and the print element substrate 10 is increased, it becomes difficult to accurately eject the droplets ejected from the ejection ports 13 onto the target position on the print medium P, and as a result, the quality of the printed image deteriorates. From the viewpoint of ejection accuracy, it is not preferable to increase the distance between the print medium P and the print element substrate 10.

In the comparative example of FIG. 5A, a temperature controller 24 is performed on the entire ejection port surface 10*a* of the print element substrate 10. In this temperature controller 24, as shown in FIG. 6A, the entire ejection port surface 10*a* is heated to about 65° C. On the other hand, although not shown, the temperature of the print medium P reaches about 75° C. In this case, since the influence of moisture evaporation 22 from the print medium P on the print element substrate 10 is large, dew condensation occurs on the ejection port surface 10*a*. In particularly, more dew condensation droplets 23 are generated in the downstream side region of the ejection port surface 10*a*.

In the comparative example of FIG. 5B, as shown in FIG. 6B, the entire ejection port surface 10*a* of the print element substrate 10 is heated to about 75° C. by the temperature controller 24. As a result, the generation of the dew condensation droplet 23 is suppressed, so that it is possible to suppress the ejection droplet protruded from the ejection port 13 from touching the dew condensation droplet 23 or the dew condensation droplet 23 from entering into the ejection port 13 at the time of the ejection. As a result, it is possible to suppress ejection failure and to suppress image deterioration.

However, the influence of moisture evaporation 22 is small in the region on the upstream side of the ejection port surface 10*a*, and dew condensation hardly occurs. In the comparative example of FIG. 5B, the entire ejection port surface 10*a* is heated uniformly, and the region where dew condensation is hardly generated is also heated to about 75° C. Therefore, a large amount of energy is required to suppress dew condensation.

On the other hand, in the liquid ejection head 30A of the present embodiment shown in FIG. 5C, the ejection port surface 10*a* is divided into two of a divided region 10*a*-1 on the upstream side and a divided region 10*a*-2 on the downstream side, as shown in FIG. 6C. The divided region 10*a*-1 on the upstream side is heated to 65° C. by the temperature controller 24*a*, and the divided region 10*a*-2 on the downstream side is heated to 75° C. by the temperature controller 24*b*. Thus, unnecessary energy consumption can be suppressed, and dew condensation occurring on the ejection port surface 10*a* of the print element substrate 10 can be efficiently prevented.

In the example of the liquid ejection head 30A shown in FIG. 5C, the ejection port surface 10*a* of the print element substrate 10 is divided into two divided regions of the upstream side region and the downstream side region, but the number of divisions may be 3 or more. The temperature controlled by the temperature controllers of each divided region may be appropriately determined in consideration of the ejection characteristics of the liquid ejection head 30A, the reliability of the liquid, the degree of deterioration of the print quality due to dew condensation accompanying long-term continuous printing, and the like.

Although the effects of moisture evaporation 22 and temperature control have been described with reference to the print medium P, the same can be said for the transfer body 2 shown in FIG. 1. That is, a laminar flow boundary layer is formed on the transfer body 2 by evaporation of water from the liquid that is ejected on the transfer body 2 as the medium on which the liquid is ejected. In each print head 30, a temperature control unit 18 controls the temperature of the ejection port surface 10*a* so that the temperature of the region on the downstream side of the ejection port surface 10*a* is higher than the temperature of the region on the upstream side of the ejection port surface 10*a*. Thus, unnecessary energy consumption can be suppressed, and dew condensation occurring on the ejection port surface 10*a* of each print head 30 can be efficiently prevented.

If the printing time is short, the amount of dew condensation is small, so that the influence on the image quality is small. However, when printing is continued without recovery operation for a long time, the influence of dew condensation gradually increases. For example, even in continuous printing for about 5 minutes, the influence of dew condensation appears on the image quality. In the print apparatus 1 shown in FIG. 1, a recovery step can be interposed during printing. In this recovery step, the carriage 31 is slid and the recovery unit 12 recovers the print head 30. Since printing cannot be performed during the recovery process, a downtime occurs. The downtime associated with the execution of the recovery process causes a decrease in productivity of the printed material P2. According to the present embodiment, since the influence of dew condensation on the ejection port surface 10*a* can be suppressed, the number of recovery steps to be performed for suppressing dew condensation can be reduced, and as a result, the downtime can be reduced.

The liquid ejection head 30A or the print head 30 may be provided with a heating unit for heating the print medium P (transfer body 2) before ejecting the liquid to the print medium P. Thus, the ejection port surface 10*a* can be heated while the print medium P is heated to an appropriate temperature. As the heating unit, a heating element such as a heater, a heating device using IR irradiation (infrared irradiation) or high-frequency induction of microwaves can be used.

The heating unit may be provided outside the liquid ejection head 30A or the print head 30.

Further, the ejection port surface 10*a* includes a dew condensation region in which the distance between the ejection port surface 10*a* and the print medium P (transfer member 2) is smaller than the thickness of the laminar flow boundary layer formed on the print medium P by evaporation of water from a liquid ejected onto the print medium P. In this case, the temperature control unit 18 may control the temperature of the dew condensation region of the ejection port surface 10*a* to be higher than that of other regions.

Figure 16:
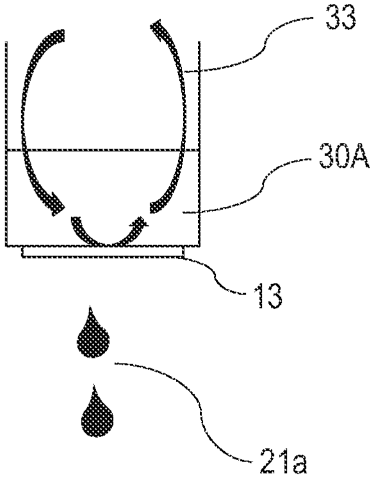
FIG. 16 is a schematic view showing a configuration in which ink supplied to a liquid ejection head is circulated.

The liquid ejection head 30A may be configured to circulate liquid. FIG. 16 is a schematic view showing a configuration in which ink supplied to the liquid ejection head is circulated. The liquid ejection head 30A is fluidly connected to an ink accommodating part 33 for accommodating the ink. The ink is supplied from the ink accommodating part 33 to the liquid ejection head 30A. In the print element substrate 10, the ink supplied from the ink accommodating part 33 is supplied to each pressure chamber via an internal flow path. In each pressure chamber, a part of the supplied ink is ejected from the ejection port 13. The ink which has not been ejected is recovered from the pressure chamber through an internal flow path to an ink accommodating part 33. As described above, ink can be circulated between the print element substrate 10 and the ink accommodating part 33, so that the print element substrate 10 can be cooled. According to this circulation structure, for example, when the temperature of the print element substrate 10 is desired to be low, the temperature can be lowered more quickly, so that the responsiveness in temperature control of the print element substrate 10 is improved. Further, it is also possible to recover a liquid that has been thickened by evaporation from the ejection port 13 or foreign matter, or to suppress thickening of a liquid occurring in the ejection port 13 or the pressure chamber.

The ink accommodating parts 33 may be provided on the ink supply side and the ink recovery side of the liquid ejection head 30A, respectively. In this case, ink is supplied to the liquid ejection head 30A from the ink accommodating part 33 on the supply side, and the ink is recovered from the liquid ejection head 30A to the ink accommodating part 33 on the recovery side. This configuration also allows the ink in the pressure chamber to flow, and thus provides the same effect as that of the circulation structure.

Modified Example

Without using the transfer body 2, the liquid ejection head 30A can directly draw a liquid image on the print medium P on a platen to manufacture a printed material. In this case, the temperature control heater 15 shown in FIG. 14 may be provided on the platen supporting the print medium P.

Figure 15A:
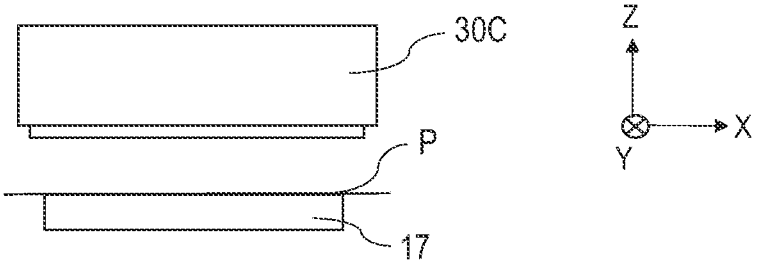
FIGS. 15A, 15B and 15C are schematic views of a platen with a temperature control heater.
Figure 15B:
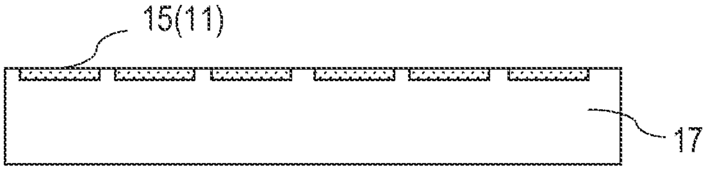
Figure 15C:
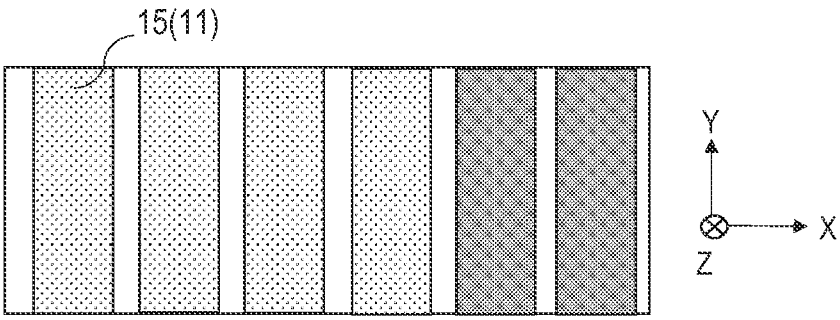

FIGS. 15A and 15B are explanatory views of the platen 17 including the temperature control heater 15. FIG. 15A shows the positional relationship between the liquid ejection head 30C and the platen 17. FIG. 15B shows an arrangement of the temperature control heater 15 provided on the platen 17.

As shown in FIG. 15A, the platen 17 is provided at a position facing the liquid ejection head 30C and supports the print medium P. The print medium P is conveyed so as to pass between the liquid ejection head 30C and the platen 17. The liquid ejection head 30C includes the print element substrate 10 from which the temperature control heater 15 is removed from the configuration shown in FIG. 14, and liquid is ejected from each of the ejection ports 13 of the print element substrate 10 toward the print medium P.

As shown in FIG. 15B, a plurality of temperature control heaters 15 are provided on a surface of the platen 17 facing the print element substrate 10. Each of the temperature control heaters 15 is arranged so as to perform one to one correspondence to the temperature sensors 14 of each controlled area 11 of the print element substrate 10. The temperature control heater 15 is activated according to the detected value of the corresponding temperature sensor 14. In this case, as in the example of FIG. 14, each controlled area 11 can be set to a temperature corresponding to a threshold value. For example, the temperature control unit 18 can control the temperature so that the temperature of the region on the downstream side of the print element substrate 10 becomes higher than the temperature of the region on the upstream side with respect to the moving direction of the print medium P.

Second Embodiment

In the first embodiment, in each of the print heads 30, the temperature of the region on the downstream side of the ejection port surface 10*a* of the print element substrate 10 is set high. On the other hand, in the print apparatus according to the second embodiment of the present disclosure, the temperature control is performed for each of the print heads.

Figure 8:
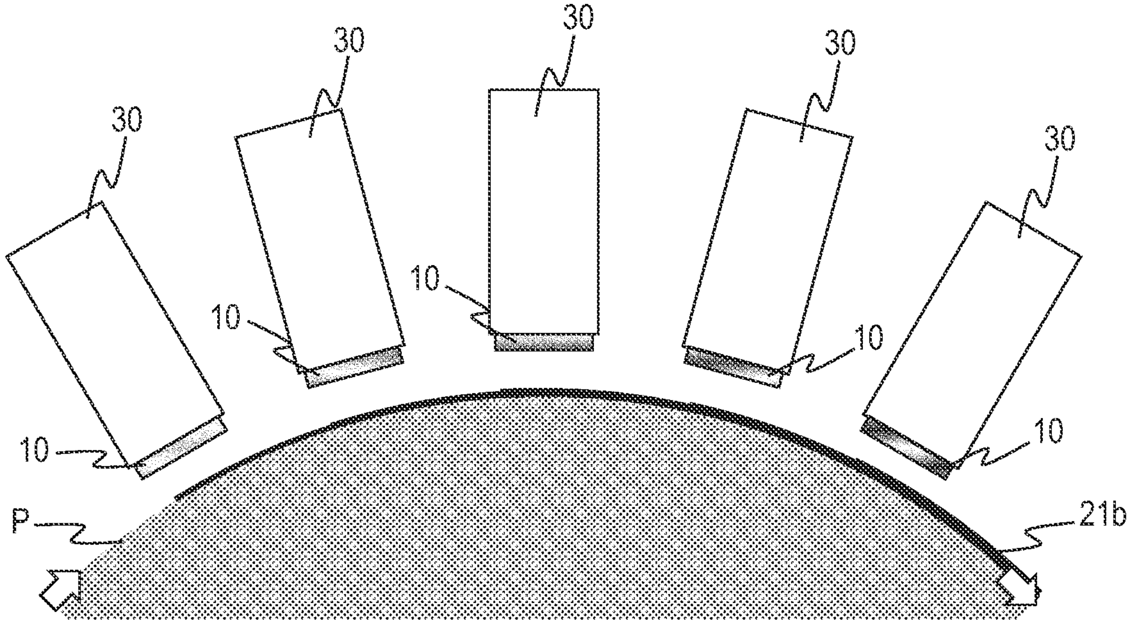
FIG. 8 is a schematic view showing a configuration of a print apparatus according to a second embodiment of the present disclosure.

FIG. 8 is a schematic view showing a configuration of a print apparatus according to a second embodiment of the present disclosure. Five print heads 30 are arranged in parallel from the upstream side to the downstream side with respect to the conveying direction of the print medium P, and each of the print heads 30 ejects the liquid to the moving print medium P. The number of print heads 30 is not limited to five. The number of the print heads 30 may be 2 or more.

Each of the print heads 30 has the same structure as the liquid ejection head 30A described in the first embodiment, but the temperature control unit 18 can individually control the temperature of the ejection port surface 10*a* of each print head 30. In this embodiment, the temperature control unit 18 includes the temperature sensor 14 and the temperature control heater 15 of each of the print heads 30, and is configured to uniformly heat the entire ejection port surface 10*a* of the print element substrate 10 in each print head 30. The temperature control unit 18 controls the temperature of the ejection port surface 10*a* of the print head 30 to be higher as moving toward the downstream side.

Also in the print apparatus of the present embodiment, in the print medium P continuously passing through each print head 30, the amount of the liquid 21*b* ejected onto the print medium P (amount of adhesion) increases as moving toward the downstream side with respect to the moving direction of the print medium P, so that the amount of moisture evaporation increases as moving toward the downstream side. As a result, dew condensation tends to occur on the ejection port surface 10*a* of the print head 30 in the downstream direction. In the present embodiment, by increasing the temperature of the ejection port surface 10*a* of the print head 30 in the downstream direction, unnecessary energy consumption can be suppressed and dew condensation can be efficiently suppressed in the entire print head 30 arranged in parallel.

Further, by making the temperature of the ejection port surface 10*a* of the print head 30 of the downstream side region higher than the temperature of the ejection port surface 10*a* of the print head 30 of the upstream side, it is possible to suppress degradation in print quality due to dew condensation.

Third Embodiment

Figure 9:
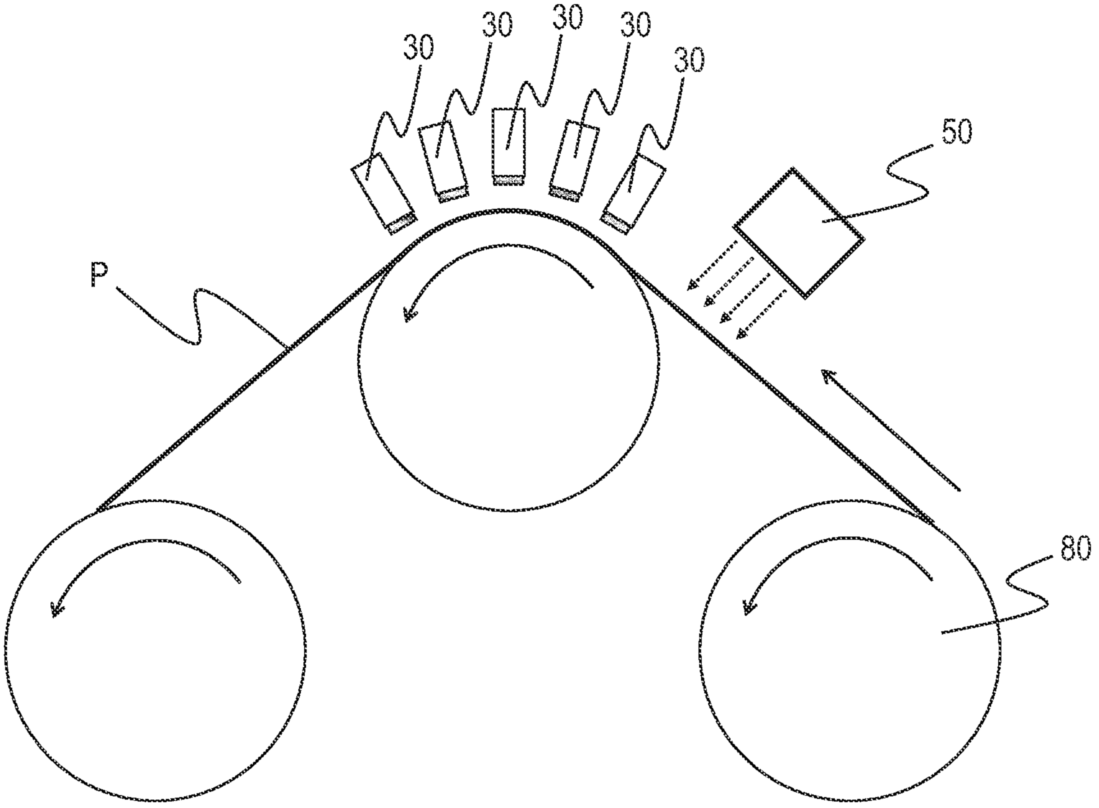
FIG. 9 is a schematic view showing a configuration of a print apparatus according to a third embodiment of the present disclosure.

FIG. 9 is a schematic view showing a configuration of a print apparatus according to a third embodiment of the present disclosure. The print apparatus produces a printed material by directly drawing a liquid image on the print medium P, and has a plurality of print heads 30, a heating unit 50, and a conveying mechanism 80 as a moving means. The conveying mechanism 80 continuously conveys the print medium P. Five print heads 30 are arranged in parallel from the upstream side to the downstream side along the conveying direction of the print medium P, and each of the print heads 30 ejects the liquid to the moving print medium P. The print heads 30 are the same as those described in the second embodiment. The number of the print heads 30 may be 2 or more.

The heating unit 50 is positioned on the upstream side of the respective print heads 30 and heats the print medium P before ejecting the liquid to the print medium P. As the heating unit 50, a heating element such as a heater, a heating device using IR irradiation (infrared irradiation) or high-frequency induction of microwaves can be used.

In the print apparatus of the present embodiment, as in the second embodiment, the more downstream side the print medium P is conveyed, the greater the amount (amount of adhesion) of the liquid 21*b* that has ejected onto the print medium P, so that dew condensation tends to occur on the ejection port surface 10*a* of the print head 30 in the downstream side. The temperature control unit 18 controls the temperature of the ejection port surface 10*a* of the print head 30 to be higher in the downstream side. Thus, unnecessary energy consumption can be suppressed and dew condensation can be efficiently suppressed in the whole print heads 30 arranged in parallel.

Fourth Embodiment

Figure 10A:
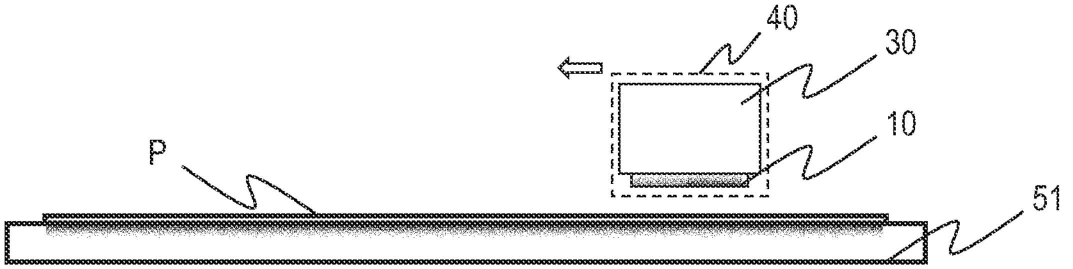
FIGS. 10A and 10B are schematic views showing a configuration of a print apparatus according to a fourth embodiment of the present disclosure.
Figure 10B:
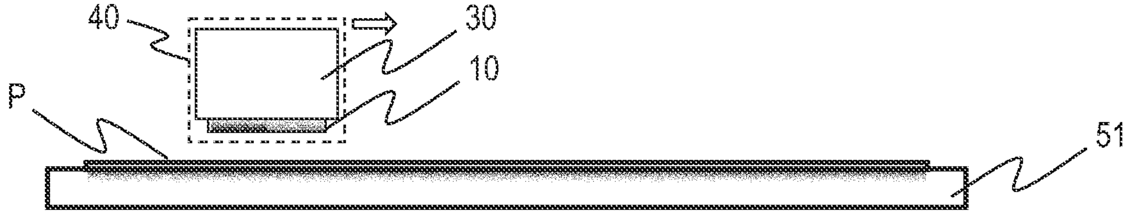

FIGS. 10A and 10B are schematic views showing a configuration of a print apparatus according to a fourth embodiment of the present disclosure. FIG. 10A shows a state in which the print head moves on the forward path, and FIG. 10B shows a state in which the print head moves on the backward path.

The print apparatus shown in FIGS. 10A and 10B is in the form of a serial head and has a carriage 40 on which the print head 30 is mounted. The platen 51 supports the print medium P. The carriage 40 can move forwardly and backwardly on the platen 51 in a direction crossing or orthogonal to the conveying direction of the print medium P. While the print medium P is stationary on the platen 51, the print head 30 ejects the liquid toward the print medium P while the carriage 40 moves forwardly and backwardly. The carriage 40 forms a moving unit for relatively moving the print head 30 with respect to the print medium P. In the following, the downstream side and the upstream side are defined with respect to the relative moving direction with respect to the print medium P when the print medium P is viewed from the print head 30. For example, in the forward path shown in FIG. 10A, the print head 30 moves to the left side in the drawing, but when the print medium P is viewed from the moving print head 30, the print medium P appears to move to the right side in the drawing. In this case, the right side in the drawing is downstream side. For the same reason, in the backward path shown in FIG. 10B, the left side in the drawing is defined as the downstream side.

The print head 30 in the present embodiment has the same structure as the liquid ejection head 30A described in the first embodiment, but the temperature control manner of the temperature control unit 18 is different from that of the first embodiment. The temperature control unit 18 switches the region to be the downstream side of the ejection port surface 10*a* between the forward path and the backward path of the carriage 40. In the example shown in FIG. 14, the ejection port row 8 are arranged in parallel from the upstream side to the downstream side along the conveying direction of the print medium, but in the present embodiment, the ejection port row 8 are arranged in parallel from the upstream side to the downstream side along the moving direction of the carriage 40. In the present embodiment, the above described substrate length XO indicates the length of the print element substrate 10 in the moving direction of the carriage 40.

As shown in FIG. 10A, when the carriage 40 moves on the forward path, the right side of the print element substrate 10 is downstream side in the drawing according to the above definition. In this case, the influence of moisture evaporation is large on the right side of the print element substrate 10, and dew condensation tends to occur. Therefore, the temperature control unit 18 controls the temperature of the region on the right (downstream) side of the print element substrate 10 to be higher than the region on the left (upstream) side of the print element substrate 10 in the movement of the forward path.

On the other hand, as shown in FIG. 10B, when the carriage 40 moves on the backward path, the left side of the print element substrate 10 in the figure is downstream side in the relative movement direction of the print medium P. In this case, the influence of moisture evaporation is large on the left side of the print element substrate 10, and dew condensation tends to occur. Therefore, in the movement of the backward path, the temperature control unit 18 controls the temperature of the region on the left (downstream) side of the print element substrate 10 to be higher than the region on the right (upstream) side of the print element substrate 10.

As described above, by switching the temperature control between the forward path and the backward path, unnecessary energy consumption can be suppressed and dew condensation can be efficiently suppressed.

In the present embodiment, the platen 51 may have a heating unit. In this case, the platen 51 heats the print medium P supported in a stationary state. Thereby, the print medium P before the liquid is applied can be heated. As the heating means, a heating element such as a heater, a heating device using IR irradiation (infrared irradiation) or high-frequency induction of microwaves can be used.

Fifth Embodiment

Figure 11A:
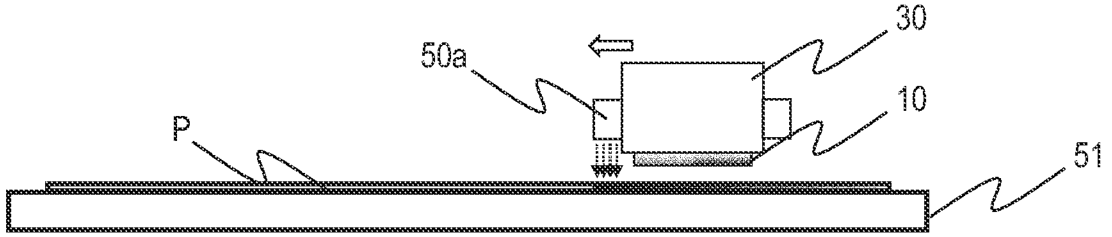
FIGS. 11A and 11B are schematic views showing a configuration of a print apparatus according to a fifth embodiment of the present disclosure.
Figure 11B:
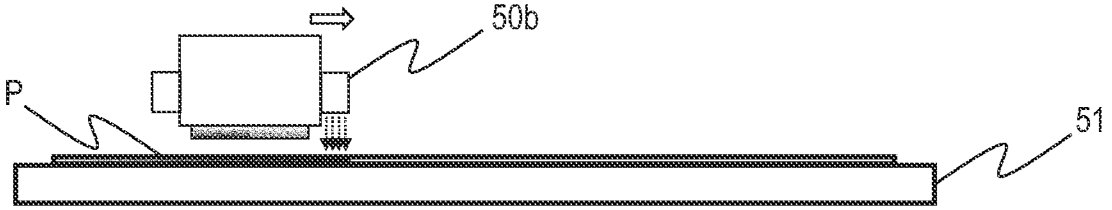

FIGS. 11A and 11B are schematic views showing a configuration of a print apparatus according to a fifth embodiment of the present disclosure. FIG. 11A shows a state in which the print head moves on the forward path, and FIG. 11B shows a state in which the print head moves on the backward path.

The print apparatus of the present embodiment differs from the print apparatus of the fourth embodiment in that it has a first heating part 50*a* and a second heating part 50*b*. Since the configuration other than the heating part 50*a* and the heating part 50*b* is the same as that described in the fourth embodiment, the description thereof will be omitted here. For convenience, the carriage 40 is omitted in FIGS. 11A and 11B.

The print head 30 has the first heating part 50*a* and a second heating part 50*b*. The first heating part 50*a* is located on the upstream side of the ejection port surface 10*a* with respect to the relative movement direction of the print medium P in the forward path of the carriage 40. The second heating part 50*b* is located on the upstream side of the ejection port surface 10*a* with respect to the relative movement direction of the print medium P in the backward path of the carriage 40. When the carriage 40 moves along the forward path, the first heating part 50*a* heats the print medium P. When the carriage 40 moves on the backward path, the second heating part 50*b* heats the print medium P.

Specifically, in the forward path, as shown in FIG. 11A, the first heating part 50*a* heats the print medium P. At this time, the temperature control unit 18 controls the temperature of the region on the right (downstream) side of the print element substrate 10 to be higher than the region on the left (upstream) side of the print element substrate 10. On the other hand, in the backward path, as shown in FIG. 11B, the second heating part 50*b* heats the print medium P. At this time, the temperature control unit 18 controls the temperature of the region on the left (downstream) side of the print element substrate 10 to be higher than the region on the right (upstream) side of the print element substrate 10.

According to the print apparatus of the present embodiment, in addition to the effects described in the fourth embodiment, the following effects are achieved.

In the fourth embodiment, the platen 51 uniformly heats the entire print medium P. In contrast, in the present embodiment, the first heating part 50*a* and the second heating part 50*b* heat the print medium P immediately before printing while moving. In this case, since it is not necessary to simultaneously heat the entire print medium, power consumption required for heating can be suppressed, and the print medium P can be efficiently heated.

Further, in the fourth embodiment, since it is necessary to arrange a heating unit such as a heater in a range covering the entire print medium P, the heating unit becomes larger when the size of the print medium P becomes larger.

On the other hand, in the present embodiment, since it is not necessary to simultaneously heat the entire print medium, it is possible to miniaturize the means for heating the print medium P.

In the second to fifth embodiments described above, the circulation structure described in the first embodiment may be applied. In particular, in the fourth and fifth embodiments, it is preferable that the circulation structure is applied so that the temperature of the region to be controlled to a low temperature can be lowered more quickly when the temperature control is switched between the forward path and the backward path.

According to the present disclosure, unnecessary energy consumption can be suppressed and dew condensation occurring on the ejection port surface (print element substrate) can be efficiently suppressed.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-126540, filed Aug. 2, 2021, which is hereby incorporated by reference herein in its entirety.

What is claimed is:

1. A liquid ejection head comprising:

a print element substrate including an ejection port surface in which a plurality of ejection ports is arranged, and a plurality of temperature control units configured to control a temperature of the ejection port surface, wherein the print element substrate is configured to eject a liquid from the plurality of ejection ports onto a medium and the liquid ejection head is configured to move the medium relatively to the liquid ejection head, wherein the ejection port surface includes a region on a downstream side of the ejection port surface in a direction in which the medium relatively moves when the medium is viewed from the liquid ejection head, and includes a region on an upstream side of the ejection port surface in the relative moving direction, wherein each of the plurality of temperature control units includes a temperature sensor configured to detect a value of the temperature of each of the downstream side region and the upstream side region, and includes a temperature control heater configured to heat each of the downstream side region and upstream side region, and wherein each of the plurality of temperature control units is configured to control the temperature of the ejection port surface by activating each of the temperature control heaters based on the detected value of the downstream side region and the upstream side region by each of the temperature sensors so that a temperature of the downstream side region becomes higher than a temperature of the upstream side region.

2. The liquid ejection head according to claim 1, wherein the ejection port surface is divided into a plurality of controlled areas, each having a temperature, and wherein each of the plurality of temperature control units is configured to individually control the temperatures of the plurality of controlled areas.

3. The liquid ejection head according to claim 2, wherein each of the temperature sensors is further configured to detect a value the temperature of each of the plurality of controlled areas, each of the temperature control heaters is further configured to heat each of the plurality of controlled areas, and each of the plurality of temperature control units is further configured to control the temperature of a controlled area of the plurality of controlled areas by activating each of the temperature control heaters based on the detected value of the controlled area by each of the temperature sensors.

4. The liquid ejection head according to claim 1, wherein the print element substrate includes a heating element for each of the plurality of ejection ports, and wherein the heating element is configured to perform an operation to generate thermal energy for ejecting the liquid from the ejection port, and is configured to be used for controlling the temperature of the ejection port surface.

5. The liquid ejection head according to claim 1, wherein, in the downstream side region of the ejection port surface, a thickness of a laminar flow boundary layer formed on the medium by evaporation of moisture from the liquid ejected onto the medium is greater than a distance between the medium and the ejection port surface.

6. The liquid ejection head according to claim 5, wherein, when a length of the print element substrate in the relative moving direction of the medium is assumed as x0 millimeters (mm), a height from the medium to the print element substrate is assumed as h (mm), a moving speed of the medium is assumed as U0 meters per second (m/s), and a kinematic viscosity of air is assumed as v ($m^2/s$), the length x0 of the print element substrate satisfies a relation of: $x0>0.0333\times h^2\times U0/v$.

7. The liquid ejection head according to claim 1, further comprising a heating unit configured to heat the medium before ejecting the liquid to the medium.

8. The liquid ejection head according to claim 1, wherein the relative moving direction of the medium includes a first direction and a second direction opposite to the first direction, and wherein the temperature control unit is configured to switch a region on the downstream side of the ejection port surface in the first direction and in the second direction.

9. The liquid ejection head according to claim 1, wherein the print element substrate is a plurality of the print element substrates disposed over an entire printable region in a width direction of the medium.

10. The liquid ejection head according to claim 1, wherein the medium is a transfer body for temporarily holding an intermediate image for transfer and, when ejected, the liquid is ejected from the plurality of ejection ports towards the transfer body to form the intermediate image.

11. The liquid ejection head according to claim 1, wherein the print element substrate is configured to circulating the liquid between the print element substrate and an accommodating unit accommodating the liquid.

12. A liquid ejection apparatus comprising:

a liquid ejection head including a print element substrate, the print element substrate having an ejection port surface in which a plurality of ejection ports is arranged and a plurality of temperature control units configured to control a temperature of the ejection port surface; and a moving unit configured to relatively move the liquid ejection head and a medium onto which a liquid is ejected, wherein the liquid is ejected from the plurality of ejection ports onto the medium relatively moved, wherein the ejection port surface includes a region on a downstream side of the ejection port surface in a direction in which the medium is relatively moved when the medium is viewed from the liquid ejection head, and includes a region on an upstream side of the ejection port surface in the relative moving direction, and wherein each of the plurality of temperature control units includes a temperature sensor configured to detect a value of the temperature of each of the downstream side region and the upstream side region, and includes a temperature control heater configured to heat each of the downstream side region and the upstream side region, and wherein each the plurality of temperature control units is configured to control the temperature of the ejection port surface by activating each of the temperature control heaters based on the detected value of the downstream side region and the upstream side region by each of the temperature sensors so that a temperature of the downstream side region becomes higher than a temperature of the upstream side region.

13. The liquid ejection apparatus according to claim 12, wherein the ejection port surface is divided into a plurality of controlled areas, each having a temperature, and wherein each of the temperature sensors is further configured to detect a value the temperature of each of the plurality of controlled areas, each of the temperature control heaters is further configured to heat each of the plurality of controlled areas, and each of the plurality of temperature control units is further configured to control the temperature of a controlled area of the plurality of controlled areas by activating each of the temperature control heaters based on the detected value of the controlled area by each of the temperature sensors.

14. The liquid ejection apparatus according to claim 12, further comprising a heating unit configured to heat the medium before ejecting the liquid to the medium.

15. The liquid ejection apparatus according to claim 12, wherein the moving unit includes a carriage on which the liquid ejection head is mounted and which is configured to move along forward and backward paths in a direction intersecting a conveying direction of the medium, and wherein the temperature control unit is configured to switch a region on the downstream side of the ejection port surface between the forward path and the backward path of the carriage.

16. The liquid ejection apparatus according to claim 15, wherein the liquid ejection head includes a first heating part located on an upstream side of the ejection port surface in a relative movement direction of the medium in the forward path of the carriage, and a second heating part located on an upstream side of the ejection port surface in the relative movement direction of the medium in the backward path of the carriage, and wherein the first heating part heats the medium when the carriage moves along the forward path, and the second heating part heats the medium when the carriage moves along the backward path.

17. The liquid ejection apparatus according to claim 12, further comprising an accommodating unit for accommodating the liquid supplied to the print element substrate, wherein the print element substrate and the accommodating unit are configured to circulate the liquid between the print element substrate and the accommodating unit.

18. A liquid ejection apparatus comprising:

a plurality of liquid ejection heads each of which having a print element substrate includes an ejection port surface in which a plurality of liquid ejection ports are arranged, and a temperature control unit configured to control a temperature of the ejection port surface, and each liquid ejection port of the plurality of liquid ejection ports is configured to eject a liquid onto a moving medium;

wherein the plurality of liquid ejection heads are arranged in parallel from an upstream side to a downstream side in a moving direction in which the moving medium is moved, wherein each of the plurality of temperature control units includes a temperature sensor configured to detect a value of the temperature of each of the downstream side and the upstream side, and includes a temperature control heater configured to heat each of the downstream side and upstream side, and wherein each of the plurality of temperature control units controls the temperature of an ejection port surface of a liquid ejection head so as to raise the temperature of the ejection port surface of the liquid ejection head toward the downstream side along the moving direction by activating each of the temperature control heaters based on the detected value of the downstream side and the upstream side by each of the temperature sensors.

* * * * *